US010552420B2

(12) United States Patent
Christie et al.

(10) Patent No.: US 10,552,420 B2
(45) Date of Patent: Feb. 4, 2020

(54) SYSTEMS AND METHODS FOR COMPRESSING AND EXTRACTING INFORMATION FROM MARKETPLACE TAXONOMIES

(71) Applicant: ChannelAdvisor Corporation, Morrisville, NC (US)

(72) Inventors: Joseph Christie, Cary, NC (US); Cameron Bowe, Morrisville, NC (US)

(73) Assignee: ChannelAdvisor Corporation, Morrisville, NC (US)

( * ) Notice: Subject to any disclaimer, the term of this patent is extended or adjusted under 35 U.S.C. 154(b) by 718 days.

(21) Appl. No.: 15/247,445

(22) Filed: Aug. 25, 2016

(65) Prior Publication Data
US 2017/0053001 A1    Feb. 23, 2017

Related U.S. Application Data

(63) Continuation of application No. 13/827,750, filed on Mar. 14, 2013, now Pat. No. 9,430,482.

(60) Provisional application No. 61/621,707, filed on Apr. 9, 2012.

(51) Int. Cl.

| G06Q 30/00 | (2012.01) |
|---|---|
| G06F 16/2455 | (2019.01) |
| G06F 16/28 | (2019.01) |
| G06F 16/11 | (2019.01) |
| G06F 16/21 | (2019.01) |
| G06F 16/22 | (2019.01) |

(52) U.S. Cl.
CPC ...... *G06F 16/24561* (2019.01); *G06F 16/116* (2019.01); *G06F 16/211* (2019.01); *G06F 16/2246* (2019.01); *G06F 16/28* (2019.01)

(58) Field of Classification Search
CPC .................................................. G06Q 30/00–08
See application file for complete search history.

(56) References Cited

U.S. PATENT DOCUMENTS

| 6,828,963 B1 | 12/2004 | Rappoport |
| 7,904,340 B2 | 3/2011 | Leon et al. |

(Continued)

OTHER PUBLICATIONS

"Inbound message template definition files", Websphere, Commerce Version 6.x, www-01.ibm.com/support/knowledgecenter/api/content/n1/en-us/SSZLC2_6.0.0/com.ibm.commerce.integration.doc/refs/rcvdttag.htm, Jun. 8, 2011.

(Continued)

*Primary Examiner* — Michael Misiaszek
(74) *Attorney, Agent, or Firm* — Cooley LLP

(57) ABSTRACT

A non-transitory processor-readable medium stores code that, when executed by a processor, causes the processor to receive a first file that is in a first file format and includes taxonomy data of a first marketplace; define a second file that is in a template file format and includes the taxonomy data of the first marketplace; and send the second file to a taxonomy platform such that inventory data is mapped to a taxonomy of the first marketplace. The code further causes the processor to receive a third file that is in a second file format and includes taxonomy data of a second marketplace; define a fourth file that is in the template file format and includes the taxonomy data of the second marketplace; and send the fourth file to the taxonomy platform such that the inventory data is mapped to a taxonomy of the second marketplace.

18 Claims, 7 Drawing Sheets

(56) References Cited

U.S. PATENT DOCUMENTS

| | | | |
|---|---|---|---|
| 8,140,399 B1* | 3/2012 | Goel | G06Q 10/02 705/26.1 |
| 2002/0184111 A1* | 12/2002 | Swanson | G06Q 10/0875 705/26.5 |
| 2005/0197880 A1 | 9/2005 | Walsh et al. | |
| 2009/0119172 A1 | 5/2009 | Soloff | |
| 2013/0060662 A1* | 3/2013 | Carlson | G06Q 30/06 705/26.61 |

OTHER PUBLICATIONS

"TemplateDocument element of a template definition file", Websphere, Commerce Version 6.x, www-01.ibm.com/support/knowledgecenter/api/content/n1/en-us/SSZLC2_6.0.0/com.ibm.commerce.integration.doc/refs/rcvdttag.htm, Jun. 8, 2011.

"TemplateTag element of a template definition file", Websphere, Commerce Version 6.x, www-01.ibm.com/support/knowledgecenter/api/content/n1/en-us/SSZLC2_6.0.0/com.ibm.commerce.integration.doc/refs/rcvdttag.htm, Jun. 8, 2011.

"Message Mappers", Websphere, Commerce Version 6.x, www-01.ibm.com/support/knowledgecenter/api/content/n1/en-us/SSZLC2_6.0.0/com.ibm.commerce.integration.doc/refs/rcvdttag.htm, Jun. 8, 2011.

"Adding message mappers", Websphere, Commerce Version 6.x, www-01.ibm.com/support/knowledgecenter/api/content/n1/en-us/SSZLC2_6.0.0/com.ibm.commerce.integration.doc/refs/rcvdttag.htm, Jun. 8, 2011.

International Search Report and Written Opinion dated Aug. 15, 2013 for PCT Application No. PCT/US13/35596.

\* cited by examiner

FIG. 3

| | |
|---|---|
| ⊙ Save \| ⊙ Save and Exit \| ⊖ Cancel | ⇨ Next |
| | Required Field  Highly Recommended Field |

- ✦ Common
- ☐ Apparel
- ☐ Auto Hardware
- ☐ Baby
- ☐ Bags Luggage
- ☐ Beauty
- ☐ Health Personalcare
- ☐ Home Improvement
- ☐ Home Living
- ☐ Jewelry
- ☐ Outdoor Garden
- ☐ Pet Supplies
- ☐ Sports Goods
- ☐ Toys Games Hobbies Common

- ★ Color — ○ Use the text "abcdefg" for all items.
- ★ Image URL — ○ Pull data from the inventory field Image URL 1
- ★ Item Height — ○ Pull data from the inventory field Height
- ★ Item Length — ○ Pull data from the inventory field Length
- ★ Item Weight — ○ Pull data from the inventory field Weight
- ★ Item Width — ○ Pull data from the inventory field Width
- ★ Manufacturer — ○ Pull data from the inventory field Manufacturer
- ★ Manufacturer Part Number or ISBN — ○ Use the data in the inventory field ITEMUPN if populated, otherwise use the inventory field ITEMISBN
- ★ Product Description — ○ Pull data from the inventory field Auction Description
- ★ Selling Price — ○ Pull data from the inventory field Buy-it-Now Price
- ★ Shipping — ○ Use the text "Default" for all items
- ★ Shipping Restriction — ○ Use the text "No" for all items
- ★ Sub Category — ○ Use the text "abcdefg" for all items.
- ★ Type — ○ Use the text "abcdefg" for all items.
- ★ UPC — ○ Pull data from the inventory field UPC
- ★ Website Short Title — ○ Pull data from the inventory field Item Title
- Balloons — ○ Use the text "abcdefg" for all items.
- Brand — ○ Use the text "abcdefg" for all items.
- Currency — ○ Use the text "abcdefg" for all items.
- Item Package — ○ Use the text "abcdefg" for all items.
- Manufacturer Item URL — ○ Use the text "abcdefg" for all items.
- Marble — ○ Use the text "abcdefg" for all items.
- Model — ○ Use the text "abcdefg" for all items.
- MSRP — ○ Use the text "abcdefg" for all items.
- Over Age 18 Verification — ○ Use the text "abcdefg" for all items.
- Prop 65 — ○ Use the text "abcdefg" for all items.
- Prop 65 Motherboard — ○ Use the text "abcdefg" for all items.

600

```
┌─────────────────────────────────────────────────────┐
│ Receive, from a first marketplace from a set of     │
│ marketplaces, a first file that is in a first file  │
│ format and includes a set of data associated        │
│ with a taxonomy of the first marketplace.           │
│                        602                          │
└─────────────────────────────────────────────────────┘
                          │
                          ▼
┌─────────────────────────────────────────────────────┐
│ Define, based on at least the first file, a second  │
│ file that is in a template file format and includes │
│ the set of data associated with the taxonomy of the │
│ first marketplace.                                  │
│                        604                          │
└─────────────────────────────────────────────────────┘
                          │
                          ▼
┌─────────────────────────────────────────────────────┐
│ Send the second file to a taxonomy platform such    │
│ that a set of inventory data associated with a      │
│ merchant is mapped, based on at least the second    │
│ file, to the taxonomy of the first marketplace at   │
│ the taxonomy platform.                              │
│                        606                          │
└─────────────────────────────────────────────────────┘
                          │
                          ▼
┌─────────────────────────────────────────────────────┐
│ Receive, from a second marketplace from the set of  │
│ marketplaces, a third file that is in a second file │
│ format and includes a set of data associated with   │
│ a taxonomy of the second marketplace.               │
│                        608                          │
└─────────────────────────────────────────────────────┘
                          │
                          ▼
┌─────────────────────────────────────────────────────┐
│ Define, based on at least the third file, a fourth  │
│ file that is in the template file format and        │
│ includes the set of data associated with the        │
│ taxonomy of the second marketplace.                 │
│                        610                          │
└─────────────────────────────────────────────────────┘
                          │
                          ▼
┌─────────────────────────────────────────────────────┐
│ Send the fourth file to the taxonomy platform such  │
│ that the set of inventory data associated with the  │
│ merchant is mapped, based on at least the fourth    │
│ file, to the taxonomy of the second marketplace at  │
│ the taxonomy platform.                              │
│                        612                          │
└─────────────────────────────────────────────────────┘
```

```
┌─────────────────────────────────────────────────────────────────────┐
│ Receive a first file that is in a template file format and includes a first set of │
│ attributes associated with a taxonomy tree of a marketplace, the first set of      │
│ attributes including a first attribute and a second attribute.                     │
│ 702                                                                 │
└─────────────────────────────────────────────────────────────────────┘
                                    │
                                    ▼
┌─────────────────────────────────────────────────────────────────────┐
│ Associate the first attribute with a third attribute based on the first attribute  │
│ having a characteristic and the third attribute having the characteristic.         │
│ 704                                                                 │
└─────────────────────────────────────────────────────────────────────┘
                                    │
                                    ▼
┌─────────────────────────────────────────────────────────────────────┐
│ Associate the second attribute with the third attribute based on the second        │
│ attribute having the characteristic and the third attribute having the             │
│ characteristic.                                                     │
│ 706                                                                 │
└─────────────────────────────────────────────────────────────────────┘
                                    │
                                    ▼
┌─────────────────────────────────────────────────────────────────────┐
│ Define, based on at least the first file, a second file that is in the template file│
│ format and includes a second set of attributes associated with the taxonomy tree │
│ of the marketplace, the second set of attributes including the third attribute and │
│ excluding the first attribute and the second attribute.             │
│ 708                                                                 │
└─────────────────────────────────────────────────────────────────────┘
                                    │
                                    ▼
┌─────────────────────────────────────────────────────────────────────┐
│ Send the second file to a taxonomy platform such that a set of inventory data      │
│ associated with a merchant is mapped, based on at least the second file, to the    │
│ second set of attributes associated with the taxonomy tree of the marketplace.     │
│ 710                                                                 │
└─────────────────────────────────────────────────────────────────────┘
```

FIG. 7

SYSTEMS AND METHODS FOR COMPRESSING AND EXTRACTING INFORMATION FROM MARKETPLACE TAXONOMIES

CROSS-REFERENCE TO RELATED APPLICATION

This application is a continuation of U.S. application Ser. No. 13/827,750, filed Mar. 14, 2013, entitled "Systems and Methods for Compressing and Extracting Information from Marketplace Taxonomies," now U.S. Pat. No. 9,430,482, which claims priority to and the benefit of U.S. Provisional Patent Application No. 61/621,707, filed Apr. 9, 2012, and entitled "Systems and Methods for Compressing and Extracting Information from Marketplace Taxonomies," each of which is incorporated herein by reference in its entirety.

BACKGROUND

Embodiments described herein relate generally to systems and methods for compressing and extracting information from marketplace taxonomies. Different online marketplaces categorize items for sale using hierarchical category trees or taxonomies, which enable end users and/or consumers to more easily find items relevant to what they are browsing for. For a number of reasons such as product expansion, multiple parties managing, unintended duplication, historical reasons, bundling multiple sublevels together, automation, frequent changes, etc., taxonomies can quickly become overpopulated and confusing. In some instances, marketplaces might be composed of tens of thousands of categories, which make classification from a seller's perspective a nontrivial task.

Accordingly, a need exists for a system and method that can distill and/or compress the taxonomies of online marketplaces to a more manageable set of category items. Specifically, a need exists for a system and method that (1) allows merchants to focus on critical areas of taxonomies in classifying their items for sale; (2) allows merchants to stay current with the latest taxonomy changes published by marketplaces, and not have to reclassify their inventory with each change introduced by the marketplace; (3) enables an automated method to maintain inventory to marketplace synchronization; and/or (4) allows merchants to associate their inventory items with common attributes that apply across multiple marketplaces.

SUMMARY

A non-transitory processor-readable medium stores code that, when executed by a processor, causes the processor to receive a first file that is in a first file format and includes taxonomy data of a first marketplace; define a second file that is in a template file format and includes the taxonomy data of the first marketplace; and send the second file to a taxonomy platform such that inventory data is mapped to a taxonomy of the first marketplace. The code further causes the processor to receive a third file that is in a second file format and includes taxonomy data of a second marketplace; define a fourth file that is in the template file format and includes the taxonomy data of the second marketplace; and send the fourth file to the taxonomy platform such that the inventory data is mapped to a taxonomy of the second marketplace.

BRIEF DESCRIPTION OF THE FIGURES

FIG. 3 is a screen shot of a webpage showing attribute mapping, according to an embodiment.

FIG. 6 is a flow chart illustrating a method for transforming files into a common template file format, according to an embodiment.

FIG. 7 is a flow chart illustrating a method for compressing files, according to an embodiment.

DETAILED DESCRIPTION

Figure 1:
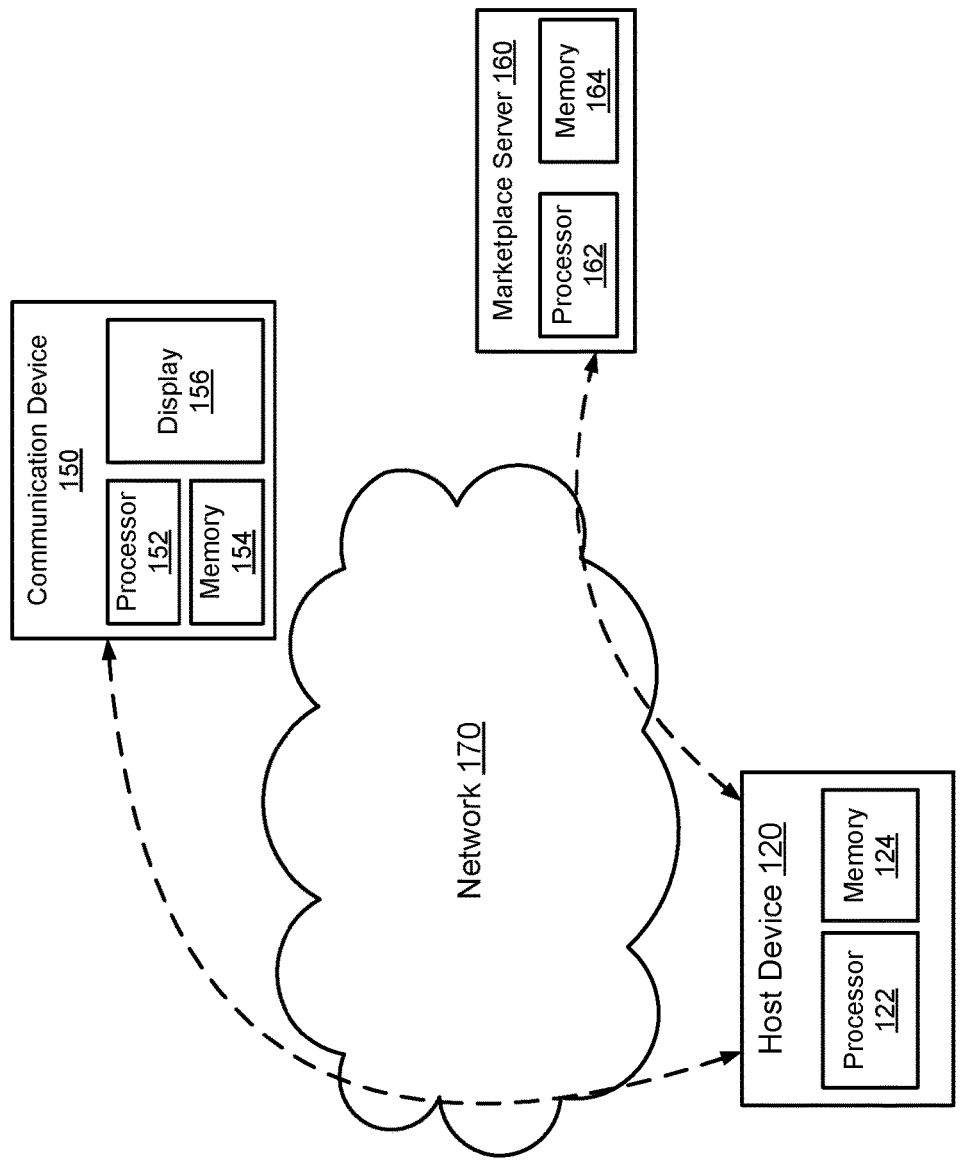
FIG. 1 is a schematic diagram that illustrates a communication device and a marketplace server in communication with a host device executing a taxonomy compression system, according to an embodiment.

In some embodiments, a non-transitory processor-readable medium stores code representing instructions to be executed by a processor. The code stored in the medium includes code to cause the processor to receive, from a first marketplace from a set of marketplaces, a first file. The first file is in a first file format, and includes a set of data associated with a taxonomy of the first marketplace. The code stored in the medium also includes code to cause the processor to define, based on at least the first file, a second file. The second file is in a template file format and includes the set of data associated with the taxonomy of the first marketplace. The template file format can be associated with each marketplace from the set of marketplaces. In some instances, the second file can be defined based on the first file and a template associated with the first marketplace. The code stored in the medium further includes code to cause the processor to send the second file to a taxonomy platform such that a set of inventory data associated with a merchant is mapped, based on at least the second file, to the taxonomy of the first marketplace at the taxonomy platform.

Moreover, the code stored in the medium includes code to cause the processor to receive, from a second marketplace from the set of marketplaces, a third file. The third file is in a second file format and includes a set of data associated with a taxonomy of the second marketplace. In some instances, the first file format, the second file format and/or the template file format can be one of extensible markup language (XML) or XML schema definition (XSD). In some instances, the first file and/or the second file can be received from the associated marketplace using at least one of an application programming interface (API) or a file transfer protocol (FTP). The code stored in the medium also includes code to cause the processor to define, based on at least the third file, a fourth file. The fourth file is in the template file format and includes the set of data associated with the taxonomy of the second marketplace. In some instances, the fourth file can be defined based on the third file and a template associated with the second marketplace. The template associated with the first marketplace can be different from the template associated with the second marketplace. The code stored in the medium further includes code to cause the processor to send the fourth file to the taxonomy platform such that the set of inventory data associated with the merchant is mapped, based on at least the fourth file, to the taxonomy of the second marketplace at the taxonomy platform.

In some embodiments, a non-transitory processor-readable medium stores code representing instructions to be executed by a processor. The code stored in the medium includes code to cause the processor to receive a first file in a template file format. In some instances, the template file format can be one of XML or XSD. The first file includes a first set of attributes associated with a taxonomy tree of a marketplace. The first set of attributes includes a first attribute and a second attribute. The first attribute is at a first level of the taxonomy tree and the second attribute is at a second level of the taxonomy tree. In some instances, the first level is different from the second level.

The code stored in the medium includes code to cause the processor to associate the first attribute and the second attribute with a third attribute based on each of the first attribute, the second attribute and the third attribute having a common characteristic. The code stored in the medium also includes code to cause the processor to define a second file in the template file format based on at least the first file. The second file includes a second set of attributes associated with the taxonomy tree of the marketplace. The second set of attributes includes the third attribute and excludes the first attribute and the second attribute. In some instances, the second set of attributes can be a subset of the first set of attributes. The code stored in the medium further includes code to cause the processor to send the second file to a taxonomy platform such that a set of inventory data associated with a merchant is mapped, based on at least the second file, to the second set of attributes associated with the taxonomy tree of the marketplace.

In some instances, the code stored in the medium can include code to cause the processor to the send the second file to a reverse-map module such that the second set of attributes is mapped, based on at least the second file, to the first set of attributes at the reverse-map module. In some instances, the code stored in the medium can include code to cause the processor to identify, from the first file, a fourth attribute. The fourth attribute can be from the first set of attributes. The fourth attribute can have a first display name included in the first file and a second display name included in the first file, where the second display name is different from the first display name. The code stored in the medium can include code to cause the processor to map the first display name and the second display name to a common display name of the fourth attribute such that the second file includes the common display name of the fourth attribute and excludes the first display name of the fourth attribute and the second display name of the fourth attribute.

In some embodiments, a system includes a map module and a reverse-map module, each of which can be implemented in at least one of a memory or a processing device. The map module can be configured to receive a first file that is in a template file format and includes a first set of attributes associated with a taxonomy of a marketplace. The first set of attributes includes a first attribute and a second attribute. The map module can be configured to associate the first attribute and the second attribute with a third attribute based on each of the first attribute, the second attribute and the third attribute having a common characteristic. The map module can be configured to define, based on the first file, a second file that is in the template file format and includes a second set of attributes associated with the taxonomy of the marketplace. As a result, the second set of attributes includes the third attribute and excludes the first attribute and the second attribute. The map module can be configured to further send the second file to a taxonomy platform such that a set of inventory data associated with a merchant is mapped, based on at least the second file, to the second set of attributes associated with the taxonomy of the marketplace.

The reverse-map module can be configured to receive the second file, and associate the third attribute with the first attribute and the second attribute. The reverse-map module can be configured to define, based on the second file, a third file that includes a third set of attributes associated with the taxonomy of the marketplace. As a result, the third set of attributes excludes the third attribute and includes the first attribute and the second attribute. The reverse-map module can be configured to send the third file to the taxonomy platform such that the set of inventory data associated with the merchant is mapped, based on at least the third file, to the third set of attributes associated with the taxonomy of the marketplace.

As used herein, a module can be, for example, any assembly and/or set of operatively-coupled electrical components associated with performing a specific function, and can include, for example, a memory, a processor, electrical traces, optical connectors, software (executing in hardware) and/or the like.

As used herein, the singular forms "a," "an" and "the" include plural referents unless the context clearly dictates otherwise. Thus, for example, the term "a compression module" is intended to mean a single module or a combination of modules configured to perform functions associated with compressing attributes of a taxonomy of a marketplace.

FIG. 1 is a schematic diagram that illustrates a communication device 150 and a marketplace server 160 in communication with a host device 120 executing a taxonomy compression system, according to an embodiment. The host device 120 is operatively coupled to, and configured to communicate with, the communication device 150 and the marketplace server 160. In some embodiments, although not shown in FIG. 1, the host device 120 can be operatively coupled to, and configured to communicate with, more than one communication device and/or marketplace server.

As shown in FIG. 1, in some embodiments, the host device 120 can be operatively coupled to the communication device 150 and/or the marketplace server 160 via a network 170. The network 170 can be any type of network that can operatively couple and enable data transmission between the host device 120 and the communication device 150 and/or the marketplace server 160. The network 170 can be, for example, a wired network (an Ethernet, local area network (LAN), etc.) a wireless network (e.g., a wireless local area network (WLAN), a Wi-Fi network, etc.) or a combination of wired and wireless networks (e.g., the Internet, etc.). For example, the host device 120 (e.g., a workstation) can be connected to the communication device 150 (e.g., a personal computer) and the marketplace server 160 (e.g., a server device) via the Internet.

The host device 120 can be any type of device configured to host and/or execute the taxonomy compression system. A taxonomy compression system can be configured to compress and extract information from marketplace taxonomies. In some embodiments, such a taxonomy compression system can include a taxonomy platform (e.g., an online platform executing on a server). In such embodiments, a user (e.g., a seller of product items on online marketplaces) that wants to sell product items on one or multiple marketplaces (e.g., Newegg, Sears) can upload and/or enter inventory data associated with the product items into the taxonomy platform (e.g., via the communication device 150 as shown in FIG. 1). Within the taxonomy compression system, the user's inventory data can be mapped to a set of common attributes (e.g., fields) associated with the taxonomy of the one or multiple marketplaces, such that the user's inventory data can be displayed in appropriate format(s) on the e-commerce website of the associated marketplace(s). Additionally, in some embodiments, the user can choose to establish one or more custom fields and associate the inventory data with the custom field(s). Details of the taxonomy compression system are described with respect to FIGS. 2-7.

In some embodiments, the host device 120 can be a single physical device. In other embodiments, the host device 120 can include multiple physical devices that are operatively coupled to each other and collectively configured to host and/or execute the taxonomy compression system. In some embodiments, the host device 120 can be configured to send data over the network 170 to and/or receive data from the communication device 150 and/or the marketplace server 160. In some embodiments, the host device 120 can be configured to function as, for example, a server device (e.g., a web server device, an application server device), a network management device, a data repository, and/or the like.

As shown in FIG. 1, the host device 120 includes a memory 124 and a processor 122. The memory 124 can be, for example, a random access memory (RAM), a memory buffer, a hard drive, a database, an erasable programmable read-only memory (EPROM), an electrically erasable read-only memory (EEPROM), a read-only memory (ROM), and/or so forth. In some embodiments, the memory 124 stores instructions to cause the processor 122 to execute modules, processes, services, and/or functions associated with the taxonomy compression system.

The processor 122 of the host device 120 can be any suitable processing device configured to run and/or execute the taxonomy compression system and associated services and processes. For example, the processor 122 can be configured to execute a common field compression service, a display name override process, a publishing service, a reverse mapping process, a taxonomy comparison service, a re-mapping service, etc., as further described with respect to FIGS. 2-7. In some embodiments, the processor 122 can be a general purpose processor, a Field Programmable Gate Array (FPGA), an Application Specific Integrated Circuit (ASIC), a Digital Signal Processor (DSP), and/or the like.

The marketplace server 160 can be any type of device associated with hosting an e-commerce website (e.g., newegg.com, sears.com) for a marketplace (e.g., Newegg, Sears). The marketplace server 160 can be operatively coupled to, and configured to communicate with, the host device 120. In some embodiments, the marketplace server 160 can provide data and/or information associated with a taxonomy of the marketplace to the host device 120 and receive data feeds associated with product items from the host device 120. As a result, the product items can be advertised for sell on the e-commerce website of the marketplace.

In some embodiments, the marketplace server 160 can be, for example, a server device (e.g., a web server device, an application server device), a network management device, a data repository, and/or the like. For example, the marketplace server 160 can be a web server device that hosts and maintains the e-commerce website. For another example, the marketplace server 160 can be a device that is operatively coupled to, and provides support to, a web server device that hosts the e-commerce website.

As shown in FIG. 1, the marketplace server 160 includes a processor 162 and a memory 164. The processor 162 can be any suitable processing device configured to run and/or execute modules, functions, services and/or processes associated with providing data to and receiving data from the host device 120, and processing the received data. The processor 162 can be a general purpose processor, an FPGA, an ASIC, a DSP, and/or the like. Similar to the memory 124 of the host device 120, the memory 164 can be, for example, a RAM, a memory buffer, a hard drive, a database, an EPROM, an EEPROM, a ROM, and/or so forth. In some embodiments, the memory 164 can store instructions to cause the processor 162 to execute modules, processes, services, and/or operations associated with transmitting data between the marketplace server 160 and the host device 120, data processing, and/or other functions of the marketing server 160.

The communication device 150 can be any type of device that can be used by a user to communicate with the host device 120 and send inventory data to the host device 120. The communication device 150 can be, for example, a computing entity (e.g., a personal computing device such as a desktop computer, a laptop computer, etc.) a mobile communication device (e.g., a smart phone), a personal digital assistant (PDA), a tablet, and/or so forth. Although not shown in FIG. 1, in some embodiments, the communication device 150 can include one or more network interface devices (e.g., a network interface card) configured to connect the communication device 150 to the network 170, and enable communications between the communication device 150 and the host device 160. In some embodiments, the communication device 150 can be referred to as a client device.

As shown in FIG. 1, the communication device 150 has a processor 152, a memory 154, and a display 156. The processor 152 can be any suitable processing device configured to run and/or execute modules, operations, services and/or processes associated with providing inventory data from the communication device 150 to the host device 120, and/or other functions of the communication device 150. The memory 154 can be, for example, a random access memory (RAM), a memory buffer, a hard drive, and/or so forth. The display 156 can be any suitable display device such as, for example, a liquid crystal display (LCD) screen, a light-emitting diode (LED) screen, a cathode ray tube display (CRT), or the like. In some embodiments, although not shown in FIG. 1, the communication device 150 can include and/or be coupled to an output device such as, for example, an audio output device (e.g., a speaker), a tactile output device, a printer, and/or the like.

In some embodiments, one or more portions of the host device 120 and/or one or more portions of the communication device 150 can include a hardware-based module (e.g., a DSP, a FPGA, an ASIC), a software-based module (e.g., a module of computer code stored in hardware and executed at a processor), and/or a combination of hardware and software-based modules. In some embodiments, one or more of the functions associated with the host device 120 (e.g., the functions executed by the processor 122) can be included in one or more modules associated with the host device 120. In some embodiments, one or more of the functions associated with the communication device 150 (e.g., functions executed by the processor 152) can be included in one or more modules associated with the communication device 150.

In some embodiments, the communication device 150 can be configured to perform one or more functions associated with the host device 120, and vice versa. For example, in some embodiments, at least a portion of the taxonomy compression system (as shown and described with respect to FIGS. 2-7) can be executed at the communication device 150. In other embodiments, the entire taxonomy compression system (as shown and described with respect to FIGS. 2-7) can be executed at the communication device 150. In such embodiments, the processor 152 can execute instructions associated with the taxonomy compression system that are stored local to the communication device 150 (e.g., in the memory 154). In such embodiments, the communication device 150 can communicate directly (e.g., via the network 170) with the marketplace server 160 to execute the taxonomy compression system (e.g., transform inventory data into marketing data that is to be used in advertisements of products) without using a host device (e.g., the host device 120).

Figure 2:
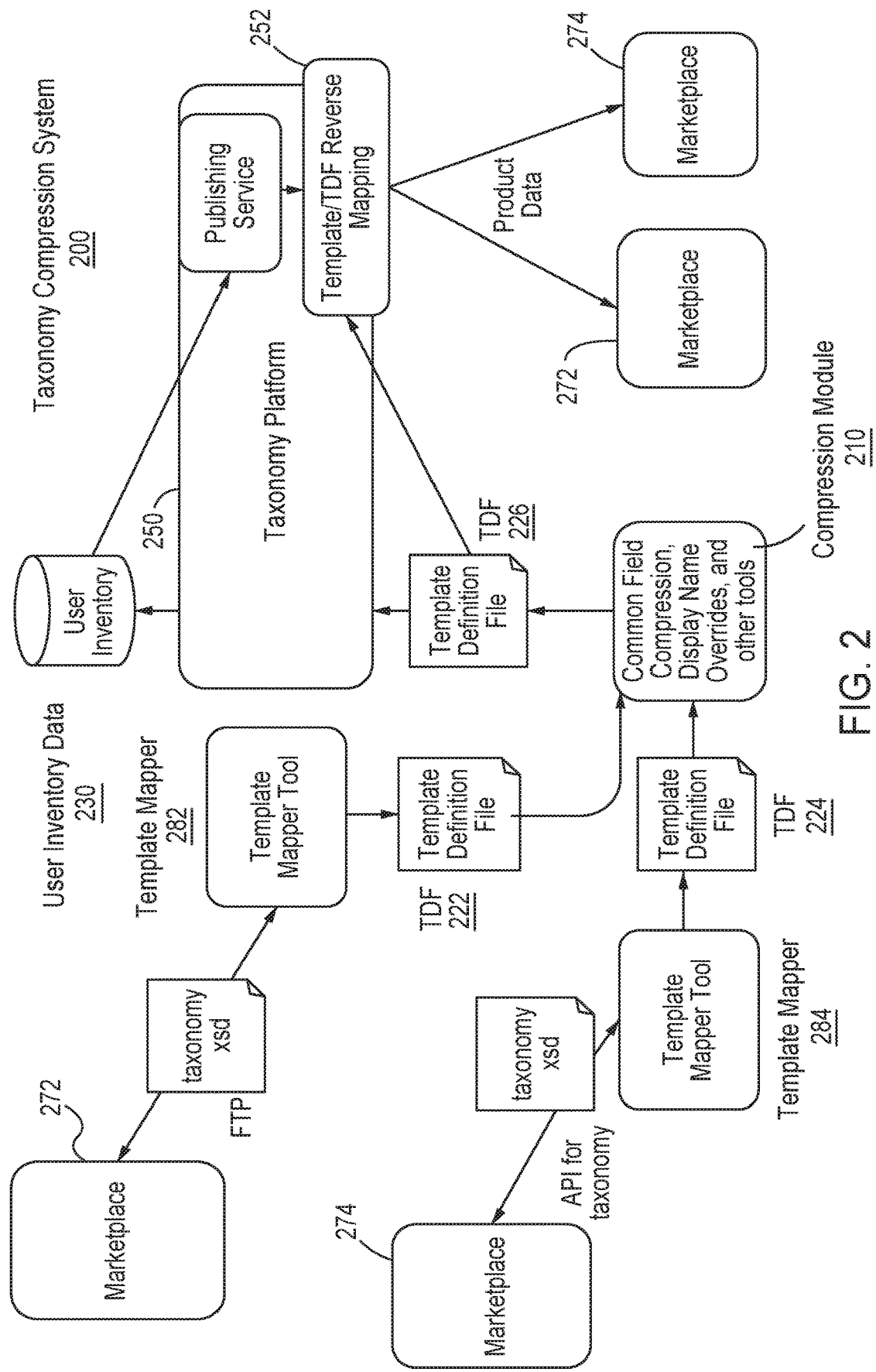
FIG. 2 illustrates a workflow and/or interaction between components of a taxonomy compression system and associated services, according to an embodiment.

FIG. 2 illustrates a workflow and/or interaction between components of a taxonomy compression system 200 and associated services, according to an embodiment. In some embodiments, the taxonomy compression system 200 can be hosted and/or executed at a physical device such as the host device 120 in FIG. 1. In other embodiments, the taxonomy compression system 200 can be hosted and/or executed at multiple physical devices that are operatively coupled to each other. In such embodiments, each component, module and/or service of the taxonomy compression system 200 can be hosted and/or executed at one or more devices from those multiple physical devices.

As shown in FIG. 2, the taxonomy compression system 200 includes one or more template mappers (e.g., template mappers 282, 284), template definition files (TDFs) (e.g., TDFs 222, 224, 226), a compression module 210, a taxonomy platform 250, services and processes such as a common field compression service (e.g., within the compression module 210), a display name override process (e.g., within the compression module 210), a publishing service (e.g., within the taxonomy platform 250), a reverse mapping process (e.g., within the taxonomy platform 250), etc. In some embodiments, the taxonomy compression system 200 can include more components, services and/or processes than those shown in FIG. 2, such as a re-mapping service and a validation service described with respect to FIGS. 4-5.

The taxonomy compression system 200 can include one or more template mappers (e.g., the template mappers 282, 284), each of which is a custom application (executed at a hardware such as a processor) that interacts with a particular marketplace. In some embodiments, such a template mapper can be configured to use a communication method or combination of communication methods (e.g., an FTP (file transfer protocol) method, an API (application programming interface) method such as a RESTful (representational state transfer) web API service, etc.) to retrieve and/or receive one or more data files describing a taxonomy (i.e., taxonomy data) of the marketplace associated with that template mapper. The template mapper can receive and/or retrieve the data files from, for example, a marketplace server (e.g., the marketplace server 160 in FIG. 1) of that marketplace. The data files containing taxonomy data of different marketplaces can have different content and/or formats. In some embodiments, the data files containing taxonomy data of a marketplace can be in the format of, for example, extensible markup language (XML), XML schema definition (XSD), XSD in combination with dynamic APIs (to describe a more dynamic taxonomy reference), and/or the like.

In the example of FIG. 2, the template mapper 282 is a custom application associated with the marketplace 272 (e.g., Newegg). The template mapper 282 can be configured to retrieve and/or receive data files containing taxonomy data of the marketplace 272 using an FTP method. The data files containing taxonomy data of the marketplace 272 can be in the format of XSD. The template mapper 284 is a custom application associated with the marketplace 274 (e.g., Sears). The template mapper 284 can be configured to retrieve and/or receive data files containing taxonomy data of the marketplace 274 using an API method. The data files containing taxonomy data of the marketplace 274 can be in the format of XSD in combination with dynamic APIs.

A template mapper associated with a marketplace can be configured to normalize taxonomy information contained within the received data files into a common file format across multiple marketplaces. In some embodiments, such a common file format can be referred to as a template file format. Similar to the data files containing taxonomy data of the marketplaces that are received at the template mappers, the template file format can be, for example, XML, XSD, or any other suitable file format. Unlike the received data files that can be in different file formats for different marketplaces, the common file format (e.g., the template file format) is the same for the multiple marketplaces associated with the taxonomy compression system 200.

As a result of normalizing the taxonomy information contained in a data file received from a marketplace, a template mapper associated with that marketplace can be configured to define a data file in the common file format that contains the taxonomy information. In some embodiments, such a data file can be referred to as a template definition file (TDF). After the template mapper defines the TDF file that is specific for a marketplace, the steps (e.g., services, processes) associated with processing the TDF file can be the same for the multiple marketplaces, as described below.

In the example of FIG. 2, the template mapper 282 can define a TDF file 222 based on a data file received from the marketplace 272 that contains taxonomy data of the marketplace 272. That is, the template mapper 282 can normalize the taxonomy data contained in the received data file into the template file format, and then define the TDF file 222 that contains the normalized taxonomy data in the template file format for the marketplace 272. Similarly, the template mapper 284 can define a TDF file 224 based on a data file received from the marketplace 274 that contains taxonomy data of the marketplace 274. That is, the template mapper 284 can normalize the taxonomy data contained in the received data file into the template file format, and then define the TDF file 224 that contains the normalized taxonomy data in the template file format for the marketplace 274.

In some embodiments, a template mapper associated with a marketplace can use one or more templates associated with that marketplace to convert a first data file that contains taxonomy data of that marketplace into a second data file in the template file format. A template can be uniquely associated with a marketplace. In other words, a template associated with a marketplace can be different from a template associated with another marketplace. In some embodiments, such a template can be defined in, for example, a TDF file. The template can include instructions and/or other information associated with transforming taxonomy data in a file format (different than the template file format) into the template file format. Thus, the template mapper can transform, based on the template, taxonomy data in the file format that is contained in the first data file into taxonomy data in the template file format that is to be included in the second data file. For example, the template mapper 282 can use a template (not shown in FIG. 2) associated with the marketplace 272 to convert a data file containing taxonomy data in XSD into a data file containing the same taxonomy data in XML. The template used by the template mapper 282 can include instructions and/or other information associated with transforming taxonomy data in the XSD format into the XML format. Details of a method or transforming a data file into the template file format are further described with respect to FIG. 6.

In some embodiments, a template mapper associated with a marketplace can be configured to define different TDF files based on different data files received from the marketplace, each of which includes taxonomy data of the marketplace. For example, the template mapper 284 can receive a first data file containing a first set of taxonomy data from the marketplace 274. The first set of taxonomy data can be associated with a taxonomy for electronic products, which are a portion of the overall taxonomy of the marketplace 274. The first data file can be in a first file format (e.g., XSD, XML). The template mapper 284 can define, based on the first set of taxonomy data, a first TDF file in the template file format. The first TDF file includes the taxonomy information contained in the first set of taxonomy data and transformed into the template file format. The template mapper 284 can also receive a second data file containing a second set of taxonomy data from the marketplace 274. The second set of taxonomy data can be associated with a taxonomy for shoes, which are another portion of the overall taxonomy of the marketplace 274 and different from the taxonomy for electronic products. The second data file can be in a second file format (e.g., XSD, XML) that is the same as or different from the first file format. The template mapper 284 can define, based on the second set of taxonomy data, a second TDF file in the template file format. The second TDF file includes the taxonomy information contained in the second set of taxonomy data and transformed into the template file format. Thus, the second TDF file is in the same file format (i.e., the template file format) as the first TDF file but contains different taxonomy data as the first TDF file.

In some embodiments, the TDF files defined at the template mappers can be intermediate files used in the pipeline of activity for the taxonomy compression system 200. In some embodiments, the TDF files can contain taxonomy information such as information describing categories, subcategories, leaf node attributes available for those subcategories, and/or the like for the associated marketplaces. In some embodiments, fields or attributes of a taxonomy of a marketplace can include validation constraints, such as potential enumerated values, types (e.g., "string", "integer", etc.), appropriate ranges, etc. In some embodiments, the TDF files can store information (e.g., a PriorityLevel parameter) that indicates an importance level (e.g., required, recommended, optional, etc.) of a field or attribute, an actual leaf node attribute name, a target value that determines when a leaf node attribute will be used during product syndication, and/or the like. More information for attributes of a taxonomy is described with respect to FIG. 3.

As shown in FIG. 2, after defining the TDFs, the template mappers can send the defined TDFs to a compression module 210 for further processing. The compression module 210 can be, for example, a hardware-based module (e.g., a DSP, a FPGA, an ASIC), a software-based module (e.g., a module of computer code stored in hardware and executed at a processor), and/or a combination of hardware and software-based modules. The compression module 210 can be configured to perform one or more services and/or processes on the taxonomy data including, for example, a common field compression service, a display name override process, etc. In some embodiments, the processing performed by the compression module 210 can be optional. Details of the services and/or processes performed at a taxonomy compression system are described with respect to FIG. 7.

The common field compression service provided by the compression module 210 can include performing one or more of the following tasks: (1) importing a TDF file, parsing potential subcategory and attributes from the TDF file; (2) identifying attributes with a common characteristic across various levels of a taxonomy tree and mapping those attributes to a common attribute based on that common characteristic; and/or (3) parsing the TDF file to find subcategory leaf nodes of the taxonomy tree, determining whether attributes with the common characteristic are contained in the leaf nodes, and if so then remapping up to a higher level in the taxonomy tree.

Specifically, in processing a received TDF file (e.g., the TDF file 222 or 224), the compression module 210 can compress taxonomy data contained in the received TDF file by, for example, mapping multiple attributes with a common characteristic to a single attribute. As a result of the compressing operation, the compression module 210 can define a compressed TDF file (e.g., the TDF file 226). When user inventory data (e.g., the user inventory data 230) is mapped to the taxonomy of the marketplace associated with the compressed TDF file, the number of fields that are mapped can be reduced by using the compressed TDF file as compared to using the uncompressed TDF file (e.g., the TDF file 222 or 224). Thus, the usability for taxonomy mappings associated with complex product data can be improved.

For example, the received TDF file can include multiple "Seller-Part-Number" attributes, each of which is at a different level in the taxonomy tree for the marketplace. The compression module 210 can map those "Seller-Part-Number" attributes to a common attribute "Seller-Part-Number" with information indicating that this common attribute can be applied across multiple levels of the taxonomy tree. For another example, the received TDF file can include a "Shirt-Size" attribute (with options: S/M/L/XL) and a "Coat-Size" attribute (with the same options: S/M/L/XL). Based on a common characteristic (i.e., size) of the two attributes, the compression module 210 can map those two attributes to a common attribute "Size."

In some embodiments, the compression module 210 can be configured to perform compression of common parent/child attributes. In a taxonomy category employing parent/child relationships, a parent specification can be, for example, an abstraction of the products in this taxonomy category, and children specifications can represent various inventory items within the taxonomy category. For example, a "Men's Shirts" category can have a parent attribute such as "Brand Name" that is common to the children within the "Men's Shirts" category. Children attributes of the "Men's Shirts" category can include "Size," "Color," etc. In compressing the taxonomy data of the "Men's Shirts" category, the compression module 210 can identify the children attributes that are common across the children items within the "Men's Shirts" category such as the "Size" attribute (e.g., all men's shirts have the same options for size as S/M/L/XL). Thus, the compression module 210 can map the "Size" attributes of the children items within the "Men's Shirts"

category to a common "Size" attribute, and include that common "Size" attribute in a common set of children attributes that is shared by the children items within the "Men's Shirts" category. In some embodiments, such a compression operation can simplify an inventory-to-taxonomy mapping by making the mapping generic instead of mapping the taxonomy data to a unique set of attributes for each possible child in the hierarchy (within the "Men's Shirts" category). In some embodiments, such a compression method for common parent/child attributes can be applied in a similar way on attributes with an indirect parent-child relation such as, for example, a grandparent/child relation (i.e., a grandparent attribute and its grandchildren attributes), a grand-grandparent/child relation (i.e., a grand-grandparent attribute and its grand-grandchildren attributes), and/or the like.

In some embodiments, similar to the compression of common parent/child attributes described above, the compression module 210 can be configured to compress attributes of taxonomy data based on a bundle relation. A product bundle can include disparate elements combined together to form one effective inventory item for sale. For example, a photo marketplace can sell a bundle as a combination of a camera, a memory card and a camera case. In such a case, an attribute common amongst the components of a bundle can be extracted and identified as a common bundle attribute. For example, when the camera, memory card and camera case have the same brand (e.g., Canon), the attribute "Brand" can be identified as a common bundle attribute for this bundle. Such a compression technique combines common requirements together for the bundle, and allows inventory mappings originally targeted to a component attribute to be mapped into a bundle taxonomy. As a result, a seller would not have to duplicate mappings specifically for each component of the bundle.

The display name override process performed by the compression module 210 can identify each attribute with multiple different display names, and then map those different display names to a common display name of that attribute. In some embodiments, one attribute can be described using different display names at different locations (e.g., different levels) of the taxonomy tree. By replacing the multiple display names with a common display name in the compressed TDF file (e.g., the TDF file 226), fewer fields are mapped when the compressed TDF file is used in taxonomy mappings, thus improving the usability for taxonomy mappings associated with complex product data. For example, a TDF file received at the compression module 210 can include a "Voltage" attribute that is described at multiple leaf nodes of the taxonomy tree as "Voltages," "Volts," "Volt," etc. The compression module 210 can execute the display name override process to specify a common display name "Voltage" for the "Voltage" attribute, and then replace the multiple display names for the "Voltage" attribute with this common display name. In some embodiments, the display names of an attribute may not be automatically detected and extracted from the taxonomy data. In such embodiments, a user (e.g., an operator, administrator, etc.) of the taxonomy compression system 200 can (e.g., manually) identify and/or specify the display names, and then store the display names (e.g., define a database table including the display names) such that these display names can be automatically found in future runs of the display name override process (e.g., based on the database table).

In some embodiments, for example, the steps performed by the display name override process can include: (1) referencing a database table (or flat file) of display names or an attribute map that is defined and maintained by an administrator of the taxonomy compression system 200; (2) traversing the taxonomy tree contained in a received TDF file, and checking for matches between the taxonomy data and the entries in the referenced database or map; (3) determining taxonomy display values (i.e., display names) by common business parsing logic (e.g., automatically adding spaces for CamelCased strings, so "NumberOfItemsPerPackage" becomes "Number Of Items Per Package"); (4) normalizing matches that are found from the taxonomy data to a common value (i.e., a common display name); and/or (5) outputting the data in a normalized TDF file that has the same format (e.g., the template file format) as the received TDF file, after applying data cleansing on the output.

In some embodiments, the compression module 210 can be configured to determine and/or identify one or more characteristics of an attribute in a taxonomy based on the nature, specification and/or requirement of the attribute. Such a characteristic of the attribute can be identified (e.g., by a label) in a TDF file (e.g., the TDF file 226) that defines the taxonomy (i.e., specify the attributes of the taxonomy). For example, an attribute can be identified as an attribute that can vary for each buyable item in a group of items, and labeled as "VaryBy=Buyable" in the TDF file; an attribute can be identified as an attribute that can vary for all items in a group of items, and labeled as "VaryBy=Any" in the TDF file; an attribute can be identified as an attribute that must match for all items in a group of items, and labeled as "VaryBy=Group" in the TDF file; and an attribute can be identified as an attribute that must vary for each item in a group of items, and labeled as "VaryBy=Unique" in the TDF file. For another example, an attribute can be identified as an attribute that is required for an item, and labeled as "Required" in the TDF file; and an attribute can be identified as an attribute that is optional for an item, and labeled as "Optional" in the TDF file.

In some embodiments, the TDF file (e.g., the TDF file 226) that defines the attributes of the taxonomy with characteristics identified can be used in mapping user inventory data (e.g., the user inventory data 230) to the taxonomy at the taxonomy platform 250. Specifically, the user inventory data can be validated against the attributes based on the identified characteristics of the attributes. For example, a TDF file defining a marketplace's taxonomy can include specifications and/or requirements for three attributes: "Brand," "Price," and "Serial Number." The attribute "Brand" can be labeled as "VaryBy=Group" and "Required," which indicate that each item from a group of items must have a common brand value. The attribute "Price" can be labeled as "VaryBy=Buyable" and "Required," which indicate that each buyable item from a group of items must have a price value that can vary across the buyable items. The attribute "Serial Number" can be labeled as "VaryBy=Any" and "Optional," which indicate that each item from a group of items can optionally have a serial number that can vary across the items. Such a TDF file can be used in mapping inventory data to the taxonomy, and particularly, in validating the inventory data against the requirements of the three attributes. For example, if a product has a brand value different from the brand value for the group, an error can be flagged for this product. For another example, if a buyable product does not have a price value, an error can be flagged for this buyable product. In some embodiments, if a certain number (e.g., above a threshold) of errors (e.g., inconsistencies with the required characteristics of the attributes) are detected, the taxonomy platform can determine a failure of representing the inventory data according to the marketplace's taxonomy, and then signal the error(s) to the marketplace.

In some embodiments, the TDF file (e.g., the TDF file 226) defined as a result of performing the common field compression service, the display name override process, and/or other processes and/or services can contain a compressed version of the marketplace taxonomy tree, along with common attributes that are identified. This TDF file can then be processed into a format that is usable by the taxonomy platform 250 of the taxonomy compression system 200. A user of the taxonomy compression system 200 can then use a user interface (UI) (not shown in FIG. 2) of the taxonomy platform 250 to define a mapping from user inventory data 230 to the common fields and taxonomy specified by the TDF file. In some embodiments, such a mapping process can be executed at, for example, a map module (not shown in FIG. 2) of the taxonomy compression system 200. The user inventory data 230 can include, for example, inventory fields and/or other business rules associated with the product items of the user. Additionally, in some embodiments, a required marketplace attribute can be substituted with a piece of text in such a mapping process. Details of the mapping process are further shown and described with respect to FIG. 4.

In some embodiments, the taxonomy compression system 200 can include a publishing service that is executed at the taxonomy platform 250. Such a publishing service can be, for example, a regularly scheduled service that sends rendered product information (with appropriate formatting changes incorporated in compliance with the specifications of the corresponding marketplaces) to the respective marketplaces (e.g., the marketplaces 272, 274 in FIG. 2).

In some embodiments, the taxonomy compression system 200 can include a template/TDF reverse mapping process. Such a template/TDF reverse mapping process can be executed at, for example, a reverse-map module 252 of the taxonomy compression system 200. The template/TDF reverse mapping process can be executed to, for example, retrieve compressed taxonomy information contained in reference TDF files associated with a marketplace, and then uncompress the compressed taxonomy information such that the taxonomy information is converted to a format compliant with the specification of that marketplace. For example, if a hypothetical field such as "Brand" in a compressed TDF file or a template had been compressed from fields originating from different source names (e.g. BabyClothingBrand, WomensPantsBrand, etc.) associated with a marketplace, the template/TDF reverse mapping process can be executed to set the value of the Brand field to the different source names before the uncompressed taxonomy information is sent to the marketplace, such that the taxonomy information is in a format compliant with the marketplace specification.

In some embodiments, in executing the template/TDF reverse mapping process for taxonomy information of a marketplace, the taxonomy compression system 200 can be configured to verify whether a value stored in a field of a template or a TDF file can be reverse-mapped to a field expected by the marketplace in an appropriate format. If the value cannot be reverse-mapped to a field expected by the marketplace in an appropriate format, an error can be flagged such that a user of the taxonomy compression system 200 can (manually) determine an appropriate field value for the marketplace. For example, a value "XL" stored in a "Size" field of a TDF file might not be able to be reverse-mapped to a "Shoe-Size" field expected by Sears, which requires a format of a number between 6 and 14 (e.g., 6, 6.5, 7, 7.5, etc.). As a result, an error can be flagged and in response to the error flag a user can manually determine an appropriate value (e.g., 6-14) for the "Shoe-Size" field expected by Sears. Thus, the template/TDF reverse mapping process can be used to verify that the value of a generic field (e.g., the "Size" filed) is appropriate for the more specific taxonomy (e.g., the "Shoe-Size" field) of the specific marketplace.

Additionally, in some embodiments, the taxonomy compression system 200 can include components (not shown in FIG. 2) specifically configured to help facilitate administrative duties associated with the taxonomy compression. Such administrative duties and associated components reference to and depend on several of the basic components of the taxonomy compression system 200 that are shown and described with respect to FIG. 2.

FIG. 3 is a screen shot of a webpage showing attribute mapping, according to an embodiment. As shown in FIG. 3, inventory data of product items can be associated with common attributes of a taxonomy such as, for example, color, item height/weight/width, manufacturer, product description, etc. In some embodiments, a user can review an attribute mapping description (e.g., presented on a webpage) that describes a mapping from the common attributes used for the marketplace (e.g., Sears) to fields in the inventory records of the product items from which the associated inventory data is read. FIG. 3 illustrates a screen shot of such an attribute mapping description. In some embodiments, the attributes associated with a marketplace can be known to the user to form a version of taxonomy for that marketplace.

As shown in FIG. 3, for example, the "Manufacturer" field required by the marketplace can be associated directly with the inventory field of the same name in the inventory records of the product items. For another example, the "Selling Price" field required by the marketplace can be associated directly with the inventory field of "Buy-It-Now Price" in the inventory records of the product items. Such an attribute mapping can be determined automatically or manually by the user. In some embodiments, the user can decide to map a common field or custom field to any appropriate inventory field in the inventory records of the product items.

Figure 4:
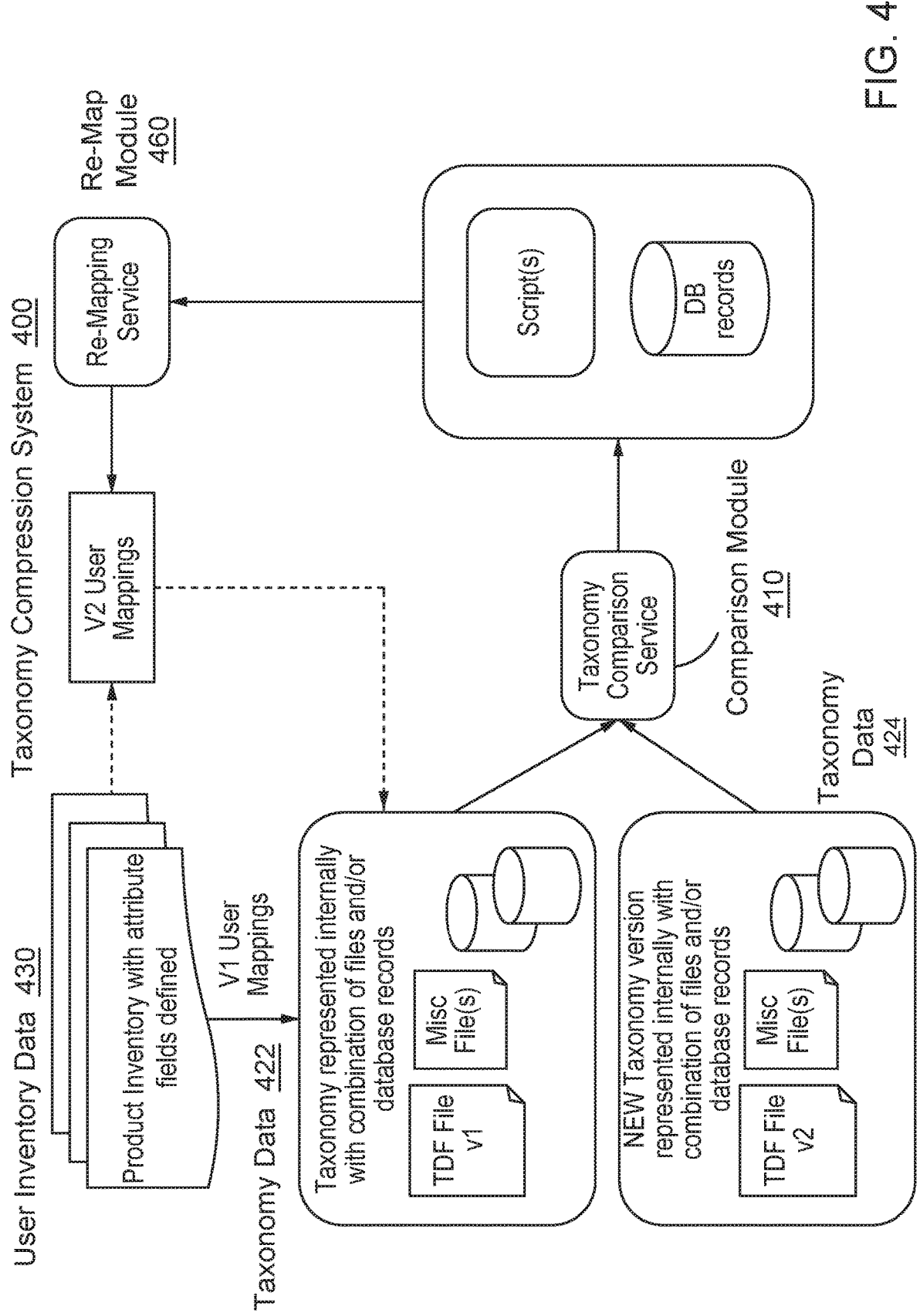
FIG. 4 is a schematic diagram illustrating components of a taxonomy compression system that automates maintenance of multiple taxonomies of a marketplace, according to an embodiment.

FIG. 4 is a schematic diagram illustrating components of a taxonomy compression system 400 configured to automate maintenance of multiple taxonomies (or multiple versions of a taxonomy) of a marketplace, according to an embodiment. The taxonomy compression system 400 can be similar to the taxonomy compression system 200 shown and described with respect to FIG. 2. Specifically, information associated with a marketplace taxonomy can be stored within, for example, TDF files in the taxonomy compression system 400. As shown in FIG. 4, a number of taxonomy support files and/or database records can be used to represent the taxonomy data internally to a taxonomy platform (e.g., the taxonomy platform 250 in FIG. 2) of the taxonomy compression system 400. Such taxonomy support files and database records are shown as "Misc File(s)" within the taxonomy platform in FIG. 4.

In some embodiments, inventory data of a user's product items (e.g., user inventory data 430 in FIG. 4) can be stored as database records in the taxonomy compression system 400. Such inventory data can include, for example, fields associated with individual attributes as well as other global categorization information. In some embodiments, the inventory data can be mapped to the marketplace's taxonomy data through mapping references. In some embodiments, an inventory attribute of a product item can be mapped to a marketplace taxonomy attribute by a reference identifier. In the example of FIG. 4, the user inventory data 430 can be mapped to the taxonomy data 422 using a mapping reference (represented by "V1 User Mappings" in FIG. 4).

For example, a user may map an inventory attribute named "ItemBrand" to a field named "Brand" on a TDF file or a template associated with a marketplace. As a result, every product item's "ItemBrand" attribute is supplied as the Brand field when the product data is sent to that marketplace. Furthermore, if the Brand field on the TDF file or the template has been compressed from fields with different names (e.g., BabyClothingBrand, WomensPantsBrand), the template/TDF reverse mapping process described above with respect to FIG. 2 can be executed to send the value of the Brand field using the different names to the marketplace.

In some embodiments, when a marketplace publishes a new version of its taxonomy, an associated taxonomy compression system (e.g., the taxonomy compression system 200 in FIG. 2) can retrieve and/or receive data associated with the new version of the taxonomy. For example, the taxonomy compression system can actively retrieve the taxonomy data from a server of the marketplace (e.g., the marketplace server 160 in FIG. 1) via an API. For another example, the taxonomy compression system can scrape the taxonomy data from a website of the marketplace using a suitable web scraping technique. For yet another example, the marketplace can send the taxonomy data to the taxonomy compression system.

The new version of the taxonomy can be minor (e.g., with slight changes in requirements, etc.) or can be major (e.g., with entire new subcategories, new requirements and/or restrictions imposed on entire existing subcategory trees, etc.). In the example of FIG. 4, the marketplace can send taxonomy data 424 to the taxonomy compression system 400. The taxonomy data 424 can be, for example, a taxonomy of the marketplace that is different from the taxonomy represented by the taxonomy data 422, or a different version (e.g., a newer version) of taxonomy from the version (e.g., an older version) of taxonomy represented by the taxonomy data 422.

In response to receiving the taxonomy data 424, a comparison module 410 of the taxonomy compression system 400 can be configured to perform a taxonomy comparison service that automatically detects differences between the taxonomy data 422 and the taxonomy data 424 of the marketplace. Furthermore, the comparison module 410 can automatically generate scripts that can translate between the different taxonomy data (e.g., translate taxonomy data 422 to the taxonomy data 424 and/or translate the taxonomy data 424 to the taxonomy data 422). Thus, when the taxonomy (or the taxonomy version) represented by the taxonomy data 424 replaces the taxonomy (or the taxonomy version) represented by the taxonomy data 422, the taxonomy compression system 400 can execute the scripts for translation and/or conversion of taxonomy data (e.g., the scripts automatically generated at the comparison module 410). As a result, inventory data (e.g., user inventory data 430) associated and/or compliant with the new marketplace requirements associated with the taxonomy data 424 can be generated for the product items. Additionally, product items not in compliance (i.e., for which no inventory data compliant with the new marketplace requirements associated with the taxonomy data 424 can be generated) can be flagged as errors for the user to fix.

In some embodiments, the comparison module 410 can be configured to perform the taxonomy comparison service to compare two sets of a marketplace's taxonomy support files and/or data files (e.g., the taxonomy data 422 and the taxonomy data 424) to determine differences at any level of the taxonomy tree. Furthermore, such a taxonomy comparison service can automatically generate a series of translation logic (e.g., in the form of scripts to be executed and data records to be referenced). The generated series of translation logic can be designed to define a new set of user mappings that can be compatible with the new marketplace taxonomy (e.g., the taxonomy represented by the taxonomy data 424) when that new marketplace taxonomy is made available.

As shown in FIG. 4, the taxonomy compression system includes a re-map module 460 configured to perform a re-mapping service. Specifically, when a marketplace taxonomy changes (e.g., from an old version of taxonomy represented by the taxonomy data 422 to a new version of taxonomy represented by the taxonomy data 424), the re-map module 460 can be configured to automatically or manually translate existing user mappings associated with the old taxonomy (or old version of taxonomy) to new user mappings associated with the new taxonomy (or new version of taxonomy). In some embodiments, the re-mapping service can reference the scripts and data records defined by the comparison module 410 (in executing the taxonomy comparison service), along with the user's existing taxonomy mapping information. In some embodiments, the re-mapping service can be executed based on the conversion scripts to traverse through existing user mappings, and for each mapping, to programmatically determine whether to remap the existing taxonomy item (e.g., an attribute or a field of the old taxonomy) to a new taxonomy item (e.g., an attribute or field of the new taxonomy). If the re-mapping service determines that a re-mapping is needed, the re-mapping service can be executed to determine whether to point to a new referenced item in the new taxonomy, or alternatively, to execute a script logic to dynamically calculate new mapping data.

In some embodiments, when a large amount of inventory data (and correspondingly a large number of user maps) exists, the re-mapping service can be substantially optimized to run on batches of user maps simultaneously instead of traversing each map individually. In some embodiments, grouping remaps together or running multiple batches of user maps in parallel can substantially minimize any potential downtime a user would have from selling live product items on a marketplace.

In some embodiments, the re-mapping service can be executed in background before a change in the taxonomy is made. For example, a marketplace can give a notice several weeks in advance that a change of taxonomy is imminent, and then the re-mapping service can be executed before the change is made live on the marketplace. In some embodiments, the execution of the re-mapping service can be automated based on, for example, a configurable schedule. In some other embodiments, the re-mapping service can be executed on-demand.

In some embodiments, as another alternative, a user can automate the process of downloading a full taxonomy from a given marketplace. The user can manually or automatically execute a process to associate product inventory descriptions to the downloaded taxonomy. The user can further manually send a file to the marketplace for placement. In some other embodiments, as yet another alternative, a user can assume (or guess, estimate, etc.) common attributes across many categories in a marketplace. The user can then develop specific coding logic to map product inventory data to those common attributes.

In some embodiments, after the new user mappings associated with the new taxonomy (e.g., the taxonomy represented by the taxonomy data 424) are determined by the re-map module 460 as a result of performing the re-mapping service, the inventory data of a marketplace can be mapped to generate new taxonomy data using a mapping reference associated with the new user mappings. In the example of FIG. 4, the user inventory data 430 can be mapped to generate new taxonomy data using a mapping reference (represented by "V2 User Mappings" in FIG. 4) associated with the new user mappings that are updated based on the comparison between the taxonomy data 422 and the taxonomy data 424.

Figure 5:
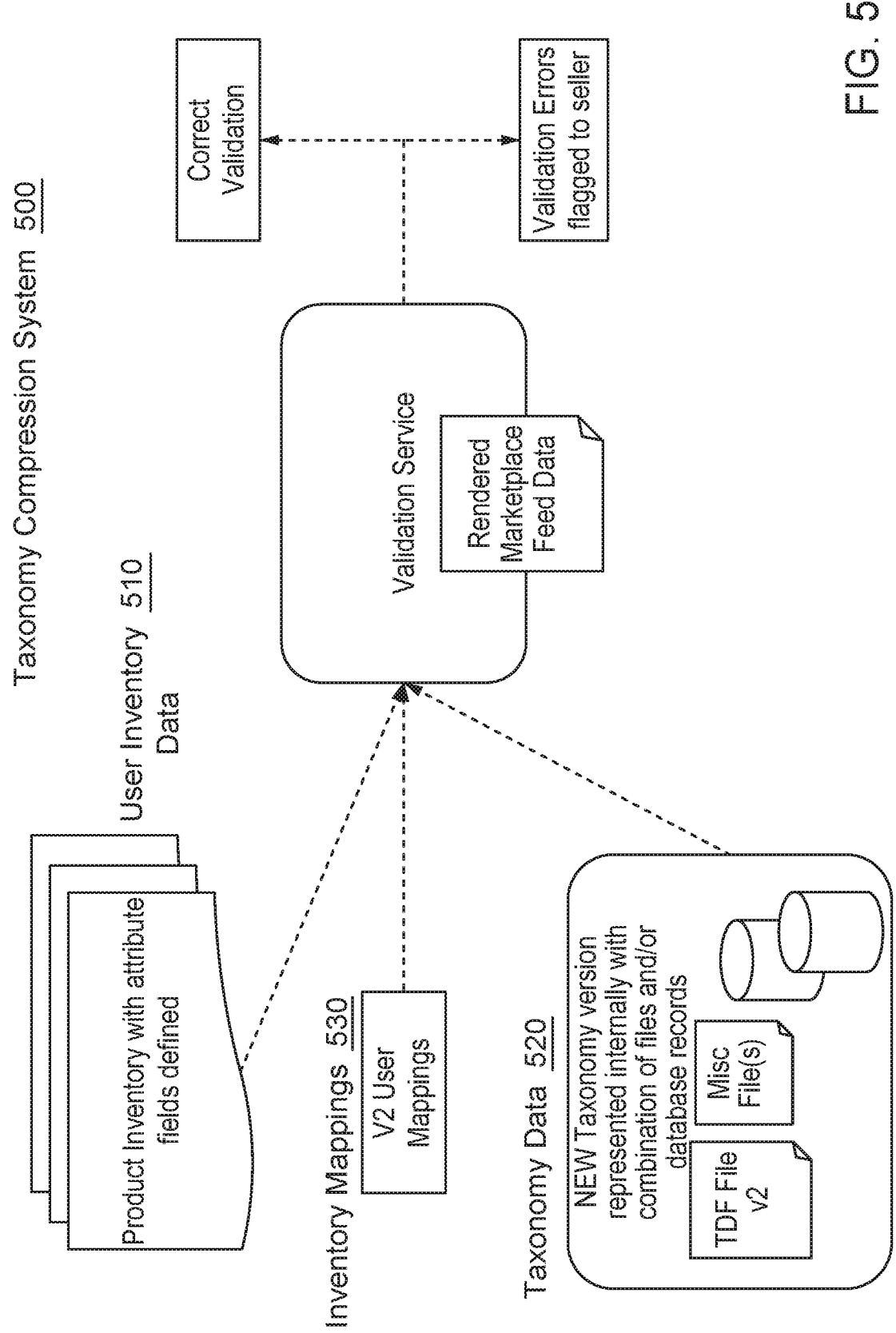
FIG. 5 is a schematic diagram illustrating a validation service executed at a taxonomy compression system, according to an embodiment.

FIG. 5 is a schematic diagram illustrating a validation service performed at a taxonomy compression system 500, according to an embodiment. The taxonomy compression system 500 can be similar to the taxonomy compression systems 200, 400 shown and described with respect to FIGS. 2 and 4. As an alternative and/or addition to the re-mapping service described with respect to FIG. 4, the validation service illustrated in FIG. 5 can be performed at the taxonomy compression system 500 to detect differences between taxonomies (or taxonomy versions) and then validate inventory data against the updated taxonomy (or taxonomy version).

As shown and described with respect to FIG. 4, when marketplace taxonomies change, the new taxonomy data (e.g., the taxonomy data 424 in FIG. 4) can be collected into a series of TDF files and/or database records that establish a new taxonomy (or a new version of taxonomy). The differences between the old taxonomy and the new taxonomy (or between the old and new taxonomy versions) can then be determined by performing a taxonomy comparison service (e.g., at the comparison module 410 in FIG. 4). In some embodiments, such differences between taxonomies (or taxonomy versions) can be rendered as a delta between the taxonomies (or taxonomy versions).

With the delta of the taxonomy data, the existing inventory mappings 530 and/or the user inventory data 510, the taxonomy compression system 500 can be configured to perform the validation service to validate the existing inventory mappings 530 against the newly changed requirements of the taxonomy data 520, and then to define new inventory mappings based on the validation result. Particularly, the inventory mappings 530 can be validated on the taxonomy fields in the taxonomy data 520 that have changed in the new taxonomy (i.e., different from the old taxonomy), but not validated on the taxonomy fields in the taxonomy data 520 that have not changed in the new taxonomy (i.e., same as the old taxonomy). Thus, the inventory mappings are not validated on the entire set of requirements of the taxonomy. As a result, the resources and computing time required to validate the inventory mappings can be reduced. Additionally, in some embodiments, the delta data can be used to automatically generate scripts that are used to translate inventory mappings based on the updated taxonomy data.

In some embodiments, the validation result can be presented to the user (e.g., a merchant of the marketplace). Specifically, when an inventory mapping is validated, a signal indicating the correct validation can be sent such that the information of the correct validation can be presented to the user (e.g., on the display 156 of the communication device 150 in FIG. 1). Thus, that inventory mapping can remain in use for the user. When an inventory mapping is not validated, a signal indicating the validation error associated with that inventory mapping can be sent such that the validation error can be flagged to the user. The user can, for example, manually change the inventory mapping accordingly. Furthermore, in some embodiments, as a result of performing the validation service, marketplace feed data (e.g., data associated with presenting inventory information on an e-commerce website of a marketplace) can be rendered and presented to the user. Such marketplace feed data can be rendered based on a sample of inventory data provided by the user. Specifically, the updated inventory mappings can be applied on the sample of inventory data to generate a preview of how the sample of inventory data is stored, maintained and/or processed within the taxonomy compression system 500. Thus, the user can have an expectation of how the remaining inventory data is stored, maintained and/or processed within the taxonomy compression system 500 based on the preview of the marketplace feed data.

FIG. 6 is a flow chart illustrating a method 600 for transforming files into a common template file format, according to an embodiment. The method 600 can be executed by one or more template mappers of a taxonomy compression system that are similar to the template mappers 282, 284 of the taxonomy compression system 200 shown and described with respect to FIG. 2. The taxonomy compression system can be hosted and/or executed at a host device similar to the host device 120 shown and described with respect to FIG. 1. The template mappers can be associated with a processor (e.g., the processor 122 of the host device 120 in FIG. 1) and memory (e.g., the memory 124 of the host device 120 in FIG. 1). The memory can be, for example, a non-transitory processor-readable medium. The code representing instructions to perform the method 600 can be stored in the non-transitory processor-readable medium associated with the template mappers, and executed by the processor associated with the template mappers. The code includes code to be executed by the processor to cause the template mappers to operate the functions illustrated in FIG. 6 and described as follows.

At 602, the taxonomy compression system can receive, from a first marketplace (e.g., Sears) from a set of marketplaces, a first file. The first file can be received at a first template mapper associated with the first marketplace. The first file can be received from, for example, a marketplace server of the first marketplace that is similar to the marketplace server 160 shown and described with respect to FIG. 1. The first file can be in a first file format such as, for example, XML, XSD, etc. The first file can include a set of data associated with a taxonomy of the first marketplace. In some embodiments, the taxonomy compression system can receive the first file using, for example, an API method (e.g., a RESTful web API service), an FTP method, and/or any other suitable transmission method.

At 604, the first template mapper can define a second file based on the first file. The second file can be in a template file format and include the set of data associated with the taxonomy of the first marketplace. The template file format can be a common file format associated with data files from each marketplace from the set of marketplaces. That is, each data file from a marketplace from the set of marketplaces, regardless of its original file format, can be converted at a template mapper of the taxonomy compression system to a data file in the template file format. Such a template file format can be, for example, XML, XSD, etc. In some embodiments, the second file can be a TDF file. In some embodiments, the second file can be defined based on the first file and a template (e.g., a TDF file) associated with the first marketplace.

At 606, the first template mapper can send the second file to a taxonomy platform of the taxonomy compression system, such that a set of inventory data associated with a merchant can be mapped, based on at least the second file, to the taxonomy of the first marketplace at the taxonomy platform. In some embodiments, the second file can be optionally processed (e.g., using a common field compression service, a display name override process, etc., as described with respect to FIG. 2) before the second file is sent to the taxonomy platform.

In the example of FIG. 2, the template mapper 284 can define the TDF file 224 (in a template file format) based on a data file received from the marketplace 274. The TDF file 224 can include taxonomy data associated with a taxonomy of the marketplace 274, which is the same as the taxonomy data contained in the data file received from the marketplace 274. The template mapper 284 can then send the TDF file 224 to the compression module 210, which can optionally perform the common field compression service, the display name override process, and/or other services or processes on the TDF file 224. The resulting file (e.g., the TDF file 226) can be sent to the taxonomy platform 250, where user inventory data 230 can be mapped to the taxonomy of the first marketplace based on the taxonomy data included in the TDF file 224.

At 608, similar to the step 602, the taxonomy compression system can receive, from a second marketplace (e.g., Newegg) from the set of marketplaces, a third file. The third file can be received at a second template mapper associated with the second marketplace. The third file can be received from, for example, a marketplace server of the second marketplace that is similar to the marketplace server 160 shown and described with respect to FIG. 1. The third file can be in a second file format (e.g., XML, XSD, etc.) that is the same as or different from the first file format. The third file can include a set of data associated with a taxonomy of the second marketplace. In some embodiments, the second template mapper can receive the third file using, for example, an API method (e.g., a RESTful web API service), an FTP method, and/or any other suitable transmission method.

At 610, the second template mapper can define a fourth file based on the third file. The fourth file can be in the template file format and include the set of data associated with the taxonomy of the second marketplace. In some embodiments, similar to the second file, the fourth file can be a TDF file. In some embodiments, the fourth file can be defined based on the third file and a template (e.g., a TDF file) associated with the second marketplace that is different from the template of the first marketplace.

At 612, the second template mapper can send the fourth file to the taxonomy platform of the taxonomy compression system, such that the set of inventory data associated with the merchant can be mapped, based on at least the fourth file, to the taxonomy of the second marketplace at the taxonomy platform. In some embodiments, similar to the second file, the fourth file can be optionally processed (e.g., provided to the common field compression service, the display name override process, etc., as described with respect to FIG. 2) before the fourth file is sent to the taxonomy platform.

In the example of FIG. 1, the template mapper 282 can define the TDF file 222 (in the template file format same as the TDF file 224) based on a data file received from the marketplace 272. The TDF file 222 can include taxonomy data associated with a taxonomy of the marketplace 272, which is the same as the taxonomy data contained in the data file received from the marketplace 272. The template mapper 282 can then send the TDF file 222 to the compression module 210, which can optionally perform the common field compression service, the display name override process, and/or other services and/or processes on the TDF file 222. The resulting file can be sent to the taxonomy platform 250, where user inventory data 230 can be mapped to the taxonomy of the second marketplace based on the taxonomy data included in the TDF file 222.

FIG. 7 is a flow chart illustrating a method 700 for compressing files, according to an embodiment. The method 700 can be executed by a compression module of a taxonomy compression system that is similar to the compression module 210 of the taxonomy compression system 200 shown and described with respect to FIG. 2. The taxonomy compression system can be hosted and/or executed at a host device similar to the host device 120 shown and described with respect to FIG. 1. The compression module can be associated with a processor (e.g., the processor 122 of the host device 120 in FIG. 1) and memory (e.g., the memory 124 of the host device 120 in FIG. 1). The memory can be, for example, a non-transitory processor-readable medium. The code representing instructions to perform the method 700 can be stored in the non-transitory processor-readable medium associated with the compression module, and executed by the processor associated with the compression module. The code includes code to be executed by the processor to cause the compression module to operate the functions illustrated in FIG. 7 and described as follows.

At 702, the compression module can receive a first file in a template file format (e.g., XML, XSD, etc.). The first file can be received from, for example, a template mapper (e.g., the template mapper 282 or 284 in FIG. 2) of the taxonomy compression system. The first file can include a first set of attributes associated with a taxonomy tree of a marketplace. In some embodiments, the first set of attributes can include a first attribute and a second attribute. In some embodiments, the first attribute and the second attribute can be at different levels of the taxonomy tree. For example, the first file can include an attribute "Shirt Color" and an attribute "Pants Color," which can be at different locations (e.g., different levels) of the taxonomy tree of the marketplace.

At 704, the compression module can associate the first attribute with a third attribute based on the first attribute having a characteristic and the third attribute having the characteristic. In the above example, the compression module can associate the attribute "Shirt Color" with an attribute "Color" based on the two attributes both having a common characteristic "color."

At 706, similar to the step 704, the compression module can associate the second attribute with the third attribute based on the second attribute having the characteristic and the third attribute having the characteristic. In the above example, the compression module can associate the attribute "Pants Color" with the attribute "Color" based on the two attributes both having the common characteristic "color."

At 708, the compression module can define a second file in the template file format based on at least the first file. The second file can include a second set of attributes associated with the taxonomy tree of the marketplace. The second set of attributes can include the third attribute and can exclude the first attribute and the second attribute. In the above example, the compression module can define a second file in the template file format such that the second file includes the attribute "Color" but excludes the attributes "Shirt Color" and "Pants Color."

At 710, the compression module can send the second file to a taxonomy platform (e.g., the taxonomy platform 250 in FIG. 2) such that a set of inventory data associated with a merchant is mapped, based on at least the second file, to the second set of attributes associated with the taxonomy tree of the marketplace. In the above example, the compression module can send the second file to the taxonomy platform such that, when the user inventory data is mapped to the attributes included in the second file, the inventory data associated with shirt color and the inventory data associated with pants color are both mapped to the "Color" attribute instead of the "Shirt Color" attribute or the "Pants Color" attribute.

In some embodiments, the second file can be sent to, for example, a reverse-map module of the taxonomy compression system such that the second set of attributes is mapped, based on at least the second file, to the first set of attributes at the reverse-map module. That is, as described with respect to FIG. 2, a template/TDF reverse mapping process can be executed at the reverse-map module to reconvert the second set of attributes to the first set of attributes. In other words, the compressed taxonomy information contained in the second set of attributes can be uncompressed to re-generate the first set of attributes, such that the taxonomy information can be converted to a format compliant with the specification of the marketplace.

Furthermore, in some embodiments, the compression module can identify a fourth attribute from the first file that has multiple display names. The compression module can then map the multiple display names of the fourth attribute to a common display name of the fourth attribute, such that the second file includes the common display name of the fourth attribute and excludes other display names of the fourth attribute. For example, the compression module can identify an attribute "Last Name" that has multiple display names such as "Family Name," "Surname," etc. The compression module can then map the multiple display names of the attribute "Last Name" to a common display name "Last Name," such that the second file includes the common display name "Last Name" of the attribute but excludes other display names of the attribute.

In some embodiments, as described herein, a taxonomy compression system can, among other functions, parse large unwieldy marketplace taxonomies into an understandable format (e.g., a common template file format). Specifically, a user (e.g., merchant) of the taxonomy compression system can be instructed to match their product items for sale to a specific category on an online marketplace.

In some embodiments, as described herein, a taxonomy compression system can condense attributes that are described in a variety of ways into a single normalized common attribute. The taxonomy compression system can also automate the process of discovering marketplace taxonomy versions, and convert existing product inventory to a new version. Furthermore, the taxonomy compression system can include a quality assurance (QA) process (e.g., the validation service described herein) for detecting whether item attributes are correctly complying with the specifications expected by the marketplace.

In some embodiments, as described herein, a taxonomy compression system can be used by a user (e.g., a seller of items on online marketplaces) to determine which items are already associated with inventory fields and/or attributes of a new marketplace. Specifically, the taxonomy compression system can be configured to evaluate existing inventory fields and/or attribute mappings associated with existing marketplaces in comparison with the taxonomy expected by the new marketplace. As a result, the existing inventory fields and/or attributes associated with the existing marketplaces that are compliant with requirements of the new marketplace can be identified. In such embodiments, the taxonomy compression system can be used by the user to estimate an amount of work needed to enter the new marketplace. For example, the user can identify inventory fields and/or attributes that are not yet compliant with the new marketplace. In some embodiments, for example, the taxonomy compression system can automatically define attribute mappings for the new marketplace by leveraging the existing inventory fields and/or attribute mappings associated with an existing marketplace to define the inventory fields and/or attribute mappings associated with the new marketplace. This can eliminate and/or reduce an amount of work used to define a new attribute mapping associated with the new marketplace.

In some embodiments, as described herein, a taxonomy compression system can be used by a user to provide a preview of a user's items on a new marketplace without specifically listing the product items on the new marketplace. Specifically, the taxonomy compression system can be configured to compare the taxonomy expected by the new marketplace with existing attribute mappings of one or more existing marketplaces. Based on the comparison, the taxonomy compression system can provide a preview of how the product items will be displayed on the new marketplace. In some embodiments, the taxonomy compression system can be configured to provide a report to the user that indicates a number of new attribute mappings needed for the user to enter the new marketplace.

For example, the taxonomy compression system can provide a preview of how the user's items would be displayed on a marketplace not yet used by the user (e.g., newegg.com) based on the inventory data, mappings to an existing marketplace used by the user (e.g., sears.com), and/or the taxonomy used by the marketplace not yet used by the user (e.g., newegg.com). Furthermore, the taxonomy compression system can provide the user with a report indicating a number of new attribute mappings that would need to be defined based on the marketplace not yet used by the user. Thus, the user can have an estimation of an amount of time and/or effort needed to enter the new marketplace (e.g., newegg.com) based on the state of his current inventory associated with the existing marketplace (e.g., sears.com).

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory processor-readable medium storing code representing instructions to be executed by a processor, the code comprising code to cause the processor to:
   receive an uncompressed template definition file (TDF) including an uncompressed set of attributes, the uncompressed set of attributes including a first set of attributes associated with a group of products and a second set of attributes associated with the group of products;
   identify that each attribute from the first set of attributes is labeled as having a value that is not variable across the group of products;
   identify that each attribute from the second set of attributes is labeled as having a value that is variable across the group of products;
   compress the uncompressed TDF to define a compressed TDF having a compressed set of attributes including (1) a single attribute for the first set of attributes based on the identifying that each attribute from the first set of attributes is labeled as having a value that is not variable across the group of products, and (2) each attribute from the second set of attributes based on the identifying that each attribute from the second set of attributes is labeled as having a value that is variable across the group of products; and
   send the compressed TDF such that a set of inventory data associated with the group of products is mapped, based at least in part on the compressed TDF, to the compressed set of attributes.

2. The non-transitory processor-readable medium of claim 1, wherein the uncompressed TDF is in a template file format, the template file format is one of extensible markup language (XML) or XML schema definition (XSD).

3. The non-transitory processor-readable medium of claim 1, further comprising code to cause the processor to:
   validate the set of inventory data associated with the group of products based on the compressed TDF to ensure that each value from a set of values for the single attribute for the first set of attributes is equal to the remaining values from the set of values.

4. The non-transitory processor-readable medium of claim 1, wherein a first attribute from the first set of attributes is at a first level of a taxonomy tree associated with an online marketplace and a second attribute from the first set of attributes is at a second level of the taxonomy tree different from the first level of the taxonomy tree.

5. The non-transitory processor-readable medium of claim 1, further comprising code to cause the processor to:
   identify the single attribute as a required attribute; and
   validate the set of inventory data to ensure that a value for the single attribute is included in the set of inventory data for the group of products.

6. The non-transitory processor-readable medium of claim 1, further comprising code to cause the processor to:
   identify, from the uncompressed TDF, an attribute from the uncompressed set of attributes, the attribute having a first display name included in the uncompressed TDF and a second display name included in the uncompressed TDF, the second display name being different from the first display name; and
   map the first display name and the second display name to a common display name of the attribute,
   the code to cause the processor to compress the uncompressed TDF to define the compressed TDF includes code to cause the processor to compress the uncompressed TDF to define the compressed TDF to include the common display name of the attribute and exclude the first display name of the attribute and the second display name of the attribute.

7. A method, comprising:
   receiving an uncompressed template definition file (TDF) including an uncompressed set of attributes, the uncompressed set of attributes including a first set of attributes associated with a group of products and a second set of attributes associated with the group of products;
   identifying that each attribute from the first set of attributes is labeled as having a value that is not variable across the group of products;
   identifying that each attribute from the second set of attributes is labeled as having a value that is variable across the group of products;
   compressing the uncompressed TDF to define a compressed TDF having a compressed set of attributes including (1) a single attribute for the first set of attributes based on the identifying that each attribute from the first set of attributes is labeled as having a value that is not variable across the group of products, and (2) each attribute from the second set of attributes based on the identifying that each attribute from the second set of attributes is labeled as having a value that is variable across the group of products; and
   sending the compressed TDF such that a set of inventory data associated with the group of products is mapped, based at least in part on the compressed TDF, to the compressed set of attributes.

8. The method of claim 7, wherein the uncompressed TDF is in a template file format, the template file format is one of extensible markup language (XML) or XML schema definition (XSD).

9. The method of claim 7, further comprising:
   validating the set of inventory data associated with the group of products based on the compressed TDF to ensure that each value from a set of values for the single attribute for the first set of attributes is equal to the remaining values from the set of values.

10. The method of claim 7, wherein a first attribute from the first set of attributes is at a first level of a taxonomy tree associated with an online marketplace and a second attribute from the first set of attributes is at a second level of the taxonomy tree different from the first level of the taxonomy tree.

11. The method of claim 7, further comprising:
identifying the single attribute as a required attribute; and
validating the set of inventory data to ensure that a value for the single attribute is included in the set of inventory data for the group of products.

12. The method of claim 7, further comprising:
identifying, from the uncompressed TDF, an attribute from the uncompressed set of attributes, the attribute having a first display name included in the uncompressed TDF and a second display name included in the uncompressed TDF, the second display name being different from the first display name; and
mapping the first display name and the second display name to a common display name of the attribute,
the compressing the uncompressed TDF includes compressing the uncompressed TDF to define the compressed TDF to include the common display name of the attribute and exclude the first display name of the attribute and the second display name of the attribute.

13. An apparatus, comprising:
a memory; and
a processor coupled to the memory, the processor configured to:
receive an uncompressed template definition file (TDF) including an uncompressed set of attributes, the uncompressed set of attributes including a first set of attributes associated with a group of products and a second set of attributes associated with the group of products;
identify that each attribute from the first set of attributes is labeled as having a value that is not variable across the group of products;
identify that each attribute from the second set of attributes is labeled as having a value that is variable across the group of products;
compress the uncompressed TDF to define a compressed TDF having a compressed set of attributes including (1) a single attribute for the first set of attributes based on the identifying that each attribute from the first set of attributes is labeled as having a value that is not variable across the group of products, and (2) each attribute from the second set of attributes based on the identifying that each attribute from the second set of attributes is labeled as having a value that is variable across the group of products; and
send the compressed TDF such that a set of inventory data associated with the group of products is mapped, based at least in part on the compressed TDF, to the compressed set of attributes.

14. The apparatus of claim 13, wherein the uncompressed TDF is in a template file format, the template file format is one of extensible markup language (XML) or XML schema definition (XSD).

15. The apparatus of claim 13, wherein the processor is further configured to:
validate the set of inventory data associated with the group of products based on the compressed TDF to ensure that each value from a set of values for the single attribute for the first set of attributes is equal to the remaining values from the set of values.

16. The apparatus of claim 13, wherein a first attribute from the first set of attributes is at a first level of a taxonomy tree associated with an online marketplace and a second attribute from the first set of attributes is at a second level of the taxonomy tree different from the first level of the taxonomy tree.

17. The apparatus of claim 13, wherein the processor is further configured to:
identify the single attribute as a required attribute; and
validate the set of inventory data to ensure that a value for the single attribute is included in the set of inventory data for the group of products.

18. The apparatus of claim 13, wherein the processor is further configured to:
identify, from the uncompressed TDF, an attribute from the uncompressed set of attributes, the attribute having a first display name included in the uncompressed TDF and a second display name included in the uncompressed TDF, the second display name being different from the first display name; and
map the first display name and the second display name to a common display name of the attribute,
the processor configured to compress the uncompressed TDF to define the compressed TDF to include the common display name of the attribute and exclude the first display name of the attribute and the second display name of the attribute.

* * * * *